United States Patent [19]

Takahiro

[11] Patent Number: 4,806,022
[45] Date of Patent: Feb. 21, 1989

[54] MINIATURE LINEAR GUIDE APPARATUS
[75] Inventor: Seki Takahiro, Maebashi, Japan
[73] Assignee: Nippon Seiko Kabushiki Kaisha, Tokyo, Japan
[21] Appl. No.: 151,588
[22] Filed: Feb. 2, 1988
[30] Foreign Application Priority Data Feb. 2, 1987 [JP] Japan ............... 62-13856[U]

[51] Int. Cl.⁴ .................................. F16C 29/06
[52] U.S. Cl. .................................. 384/45
[58] Field of Search ............... 384/45, 43, 44; 464/168

[56] References Cited

U.S. PATENT DOCUMENTS

| | | | |
|---|---|---|---|
| 4,472,003 | 9/1984 | Osawa . | |
| 4,582,371 | 4/1986 | Mottate | 384/45 |
| 4,647,226 | 3/1987 | Mottate | 384/45 |
| 4,701,057 | 10/1987 | Kashiwabara | 384/45 |
| 4,701,058 | 10/1987 | Mottate | 384/45 |

FOREIGN PATENT DOCUMENTS 58-6010 7/1983 Japan .
61-11619 1/1986 Japan .
61-11611 1/1986 Japan .
62-136018 6/1987 Japan .

Primary Examiner—Lenard A. Footland
Attorney, Agent, or Firm—Arnold S. Weintraub; William D. Blackman

[57] ABSTRACT

A slider of a miniature linear guide apparatus includes a race member having an inverted U-shaped cross section and ball rolling grooves formed in outer surfaces of side walls respectively corresponding to ball rolling grooves of a guide rail, and a ball guide member having a pair of ball return passages in the longitudinal direction and parallel to each other. The ball return passages of the ball guide member are formed in a groove form having upwardly directed openings. The openings are directly closed by an upper plate of the race member when the ball guide member is fitted into a U-shaped recess of the race member. The race member and the ball guide member are secured to each other by fitting protrusions formed on the upper surface of the ball guide member into fixing holes formed in the upper plate of the race member to form the slider.

4 Claims, 5 Drawing Sheets

MINIATURE LINEAR GUIDE APPARATUS

BACKGROUND OF THE INVENTION

1. Field of the Invention

The present invention relates to a miniature linear guide apparatus wherein a slider is supported by a guide rail through movable rolling members disposed so that the slider is movable in the longitudinal direction of the guide rail. More particularly, the present invention relates to an improved miniature linear guide apparatus which requires a small number of parts, and which is easy to assemble and very compact.

2. Description of the Prior Art

As prior art miniature linear guide apparatus, there are examples as shown in FIGS. 1 and 2.

In this prior art apparatus, a slider 52 is assembled to a guide rail 51 having a U-shaped cross section and is slidably movable in the longitudinal direction. The slider 52 is integrally formed by fitting a ball guide member 54 into a recess of a race member 53 having an inverted U-shaped cross section. Ball rolling grooves 1B are formed in the inner surfaces of the side walls of the guide rail 51 in the longitudinal direction. Similar ball rolling grooves 11B are formed in the outer surfaces of the side walls of the race member 53 so that the ball rolling grooves 1B, respectively, oppose the ball rolling grooves 11B. Balls 5 are disposed between each pair of ball rolling grooves 1B and 11B. The ball guide member 54, which has a pair of ball no-load circulating paths (hereinafter, referred to as ball circulating paths) 56 formed therein, comprises two members including an upper cover 54a and a lower cover 54b. The ball guide member 54 is integrally secured to the race member 53 by a rivet 57.

However, in the prior art miniature linear guide apparatus, since the ball guide member 54, located within the race member 53, is defined by two members of the upper cover 54a and lower cover 54b, and since these members are secured to the race member 53 by the rivet 57 integrally, the assembly is troublesome and assembly error tends to be caused. Furthermore, since each of the upper and lower covers 54a and 54b are molded by a separate metal-mold, a deviation is frequently caused between the upper and lower covers 54a and 54b due to a dimensional error of each metal-mold. When the deviation is caused between the upper and lower covers 54a and 54b due to the assembly error or dimension error, the rolling of the balls 5 in the ball circulating paths 56 is disturbed, and the ball guide member 54 is determined to be defective. As a result, a problem is involved in that the yield of product is degraded.

Moreover, since it is difficult to form the thicknesses of the upper and lower walls of the ball circulating path 56 extremely thin, another problem is involved in that when the upper cover 54a is placed on the lower cover 54b, the height of the ball guide member 54 becomes higher than necessary, and the overall structure of the apparatus becomes large.

In addition, since the number of parts of the apparatus is large, still another problem of high cost is involved.

SUMMARY OF THE INVENTION

The present invention was made in view of the above-mentioned problems in the prior art, and it is an object of the invention to provide a miniature linear guide apparatus which is easily assembled with high positioning accuracy, which improves the yield of product, and which is very small in size and manufactured at low cost.

A miniature linear guide apparatus in accordance with the invention comprises: (a) a guide rail extending longitudinally and having a U-shaped cross section and ball rolling grooves formed in the inner surfaces of the side walls thereof, (b) a slider, including a race member having an inverted U-shaped cross section, and ball rolling grooves formed in the outer surfaces of the side walls thereof so that the ball rolling grooves respectively correspond to the ball rolling grooves of the guide rail, and (c) a ball guide member fitted into a recess of the race member and having a pair of ball circulating paths formed therein, respectively, in communication with the ball rolling grooves of the race member and ball guide member. Many balls are inserted between the ball rolling grooves of the guide rail and the race member and in the pair of ball circulaing paths of the ball guide member. The pair of ball circulating paths of the ball guide member are formed in a groove form having upward directed openings. Longitudinal opposite end portions of the ball guide member, corresponding to end portions of the race member, respectively, have laterally protruding portions which protrude towards and into the ball rolling grooves of the guide rail. Each of the laterally protruding portions is formed with a curved ball groove which brings each of the pair of ball circulating paths in communication with the corresponding pair of ball rolling grooves of the guide rail and the race member. The race member is superposed on the ball guide member to cover the openings of the groove-form ball circulating paths. The race member and the ball guide member are integrally secured by securing means having a male part and a female part, respectively, provided at corresponding positions of the race member and the ball guide member to, thus, form the slider.

Specifically, the pair of ball circulating paths are formed in a groove form having upwardly directed openings without dividing the ball guide member into two parts arranged vertically. The race member is superposed on the ball guide member to cover the upward openings. The race member and the ball guide member are integrally secured by the securing means to constitute the slider.

By virtue of this arrangement, assembly is very easy and the accuracy of the positioning can be improved. Accordingly, it is possible to completely avoid the problem in the prior art that when the upper cover and lower cover deviate from their specified positions due to an assembly error or a dimensional error, the rolling of the balls in the ball circulating paths is disturbed and the ball guide member is determined to be a defective unit resulting in degradation of the yield of product.

Furthermore, since the pair of ball circulating paths are formed by direct covering, the upwardly opening grooves formed in the ball guide member, by the race member, the height of the slider can be lowered and the overall structure can be made small in size.

In addition, since the number of parts is small, the cost can be reduced.

DESCRIPTION OF THE PREFERRED EMBODIMENTS

A first embodiment of the present invention will be described with reference to the drawings.

Figure 3:
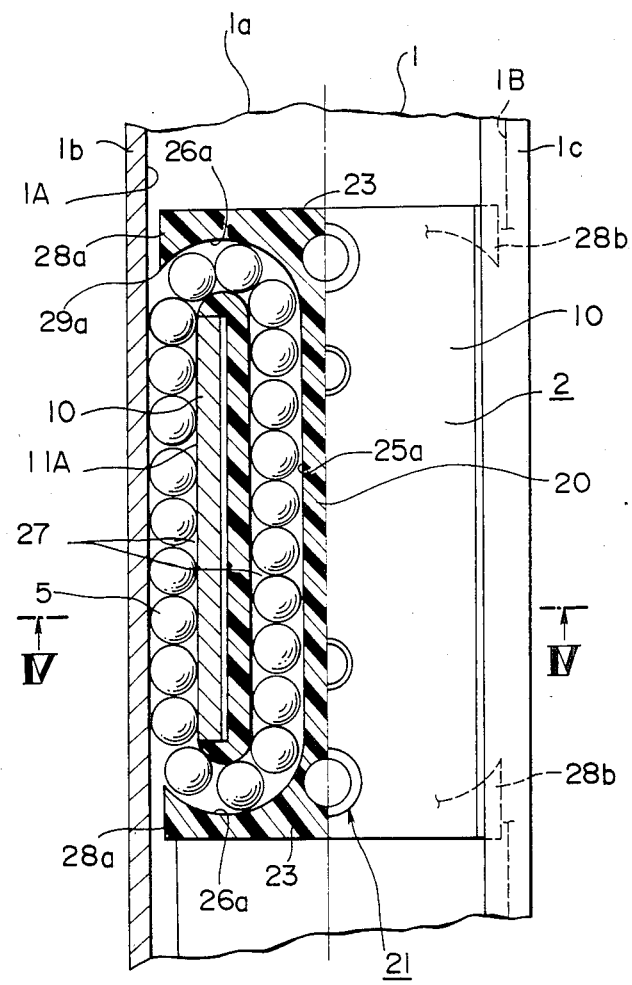
FIG. 3 is a plan view with a left half portion in cross section of a first embodiment of the present invention.
Figure 4:
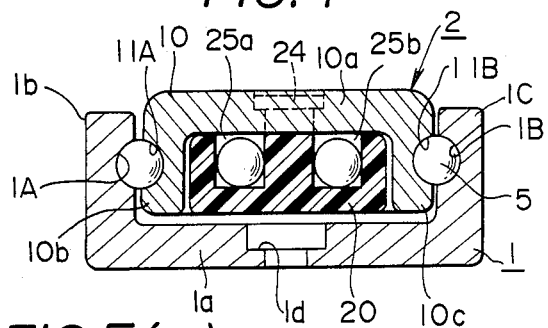
FIG. 4 is a cross sectional view taken along the line IV—IV in FIG. 3.
Figure 5A:
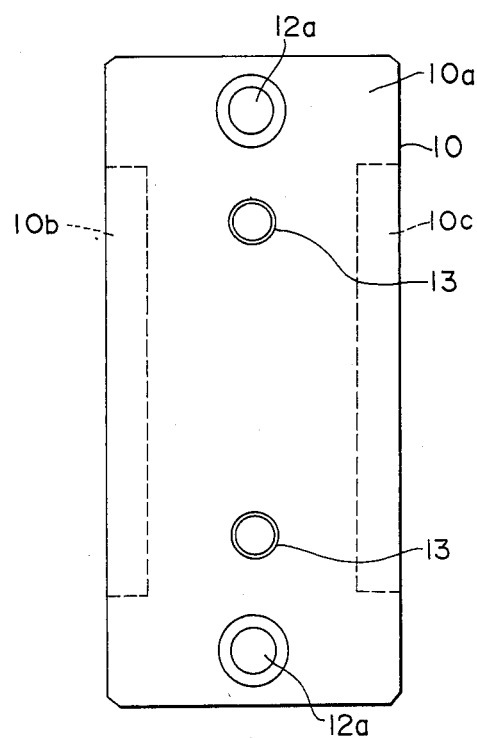
FIGS. 5a, 5b and 5c are, respectively, a plan view, a side view, and a front view of the race member in FIG. 3.
Figure 5B:
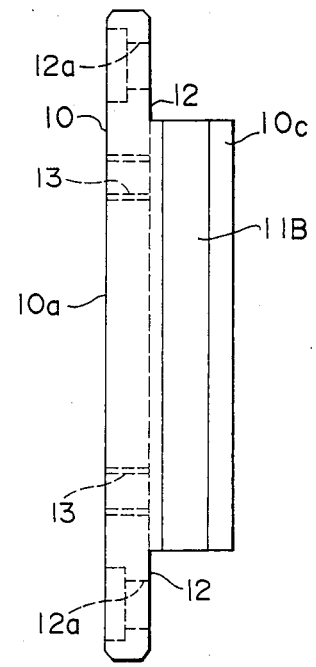
Figure 5C:
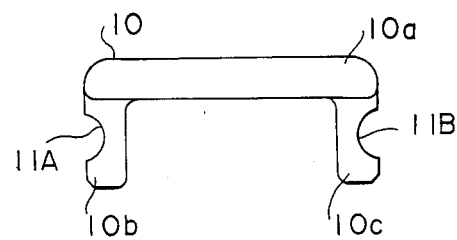

In FIGS. 3 to 5, reference number 1 designates a guide rail made of steel for guiding a slider 2. The guide rail 1 includes a bottom plate 1a and side walls 1b and 1c extending upwardly from side edges of the bottom plate 1a to form a U-shaped cross section. The side walls 1b and 1c have ball rolling grooves 1A and 1B, respectively, formed in the inner surfaces and extending in the longitudinal direction and in an opposing relationship to each other. These ball rolling grooves 1A and 1B are in parallel to each other and the cross section of the ball rolling grooves 1A and 1B is a so-called Gothic arch wherein two circular-arcs having different centers but having the same curvatures are formed in a V-shaped Furthermore, the bottom plate 1a has a screw hole 1d to mount the guide rail 1 to a desired component when the miniature linear guide apparatus is to be used.

The slider 2 includes a race member 10 made of a thin walled steel and a ball guide member 20 made of synthetic resin.

The race member 10 has an outer width narrower than an inner width between the side walls 1b and 1c of the guide rail 1, and as shown in FIG. 4, includes an upper plate 10a and side walls 10b and 10c extending downwardly from the side edges of the upper plate 10a to form an inverted U-shaped cross section. The race member 10 is disposed between the side walls 1b and 1c of the guide rail 1. The race member 10, also, has ball rolling grooves 11A and 11B formed in the outer surfaces of the side walls 10b and 10c extending in the longitudinal direction so that the ball rolling grooves 11A and 11B, respectively, oppose the ball rolling grooves 1A and 1B of the guide rail 1. The cross section of the ball rolling grooves 11A and 11B has the Gothic arch shape similar to the guide rail 1.

The upper plate 10a has extended portions 12 at longitudinally opposite ends so that the extended portions 12 extend in opposite directions beyond the ends of the side walls 10b and 10c. Each of the extended portions 12 has a fixing hole 12a formed therein to define a securing means together with a protrusion 24 which will be described later. The fixing hole 12a has a spot face formed in the upper surface of the race member 10. Furthermore, female screws 13 are formed in the race member 10 at positions inside of the securing hole 12a to mount a desired component to the race member 10.

Figure 6:
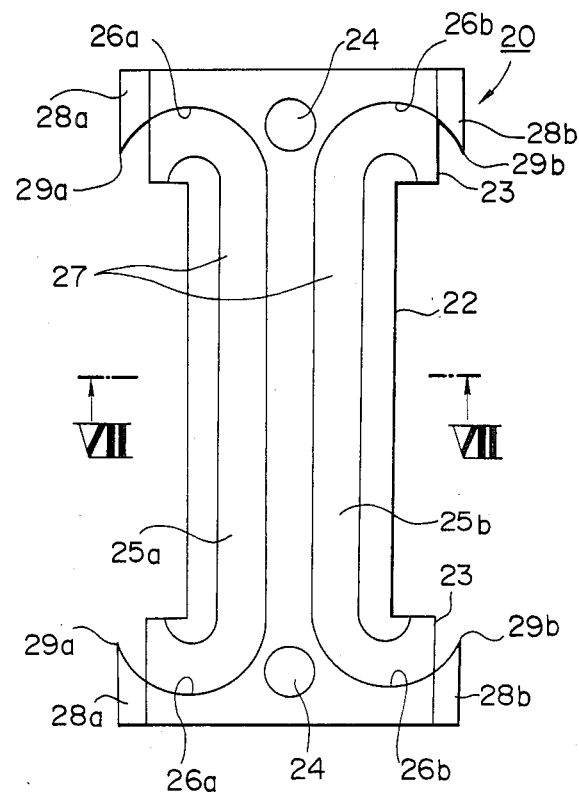
FIG. 6 is a plan view of the ball guide member in FIG. 3.
Figure 7:
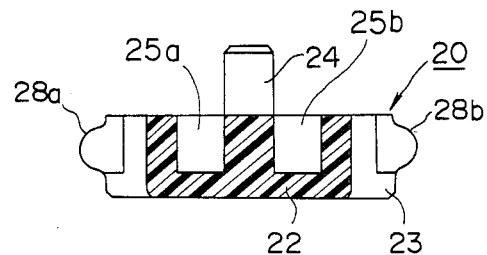
FIG. 7 is a cross sectional view taken along the line VII—VII in FIG. 6.

As shown in FIG. 6, the guide member 20, which is formed integrally by injection molding, includes a trunk section 22 having a W-shaped cross section which is fitted into a recess of the race member 10 defined by the inverted U-shaped cross section thereof. The guide member 20 also includes brim sections 23 which extend from longitudinal opposite ends of the trunk section 22. On the upper surface of each brim section 23, there is provided the column-shaped protrusion 24 which defines the securing means 21 along with the fixing hole 12a formed in the upper plate 10a of the race member 10. The protrusion 24 is fitted into the fixing hole 12a to secure the guide member 20 to the race member 10.

Within the trunk section 22 of the guide member 20, there is formed a pair of ball return passages 25a and 25b extending longitudinally and parallel to each other. The pair of ball return passages 25a and 25b are formed in the shape of grooves which open upwardly. Both ends of each of the ball return passages 25a and 25b, respectively, are in communication with curved ball grooves 26a and 26b which are semicircular shaped spaces formed in the inner side of the brim sections 23. Specifically, the inner circular-arc surface and the outer circular-arc surface of each of the curved ball grooves 26a and 26b are connected to the ball return passage 25a (or 25b) continuously. The ball return passage 25a (or 25b) and the curved ball grooves 26a and 26b constitute a ball circulating path 27.

The outside end of each of the curved ball grooves 26a and 26b, not connected to the ball return passage 25a (or 25b), has an inner circular-arc surface connected to the ball rolling groove 11A (or 11B) of the race member 10, and an outer circular-arc surface which, together with a protruding portion 28a (or 28b) of the brim section 23 extends into the ball rolling groove 1A (or 1B) towards and close to the bottom thereof of the guide rail 1. The protruding portions 28a and 28b of the brim section 23 protrude laterally, and, respectively, have acute ends 29a and 29b formed by cutting the protruding portions 28a and 28b by the curved ball grooves 26a and 26b.

In assembling the slider 2, the column-shaped protrusions 24, formed as a pair on the ball guide member 20, are fitted into the fixing holes 12a, and, then, the upper end portions of the column-shaped protrusions 24 are welded to integrally secure the ball guide member 20 to the race member 10. As a result, the groove-shaped ball return passages 25a and 25b of the trunk section 22 of the ball guide member 20, and the curved ball grooves 26a and 26b of the brim sections 23 are covered by the race member 10. Thus, the ball circulating paths 27 which are smooth, and have no stepped portion therein, are completed.

The slider 2 is loosely fitted into a U-shaped recess of the guide rail 1. Many balls 5 are rollably inserted between the ball rolling groove 1A of the guide rail 1 and the opposing ball rolling groove 11A of the race member 10, and between the ball rolling groove 1B and the opposing ball rolling groove 11B. The balls 5 are inserted in the Gothic arch-shaped channels formed by the ball rolling grooves 1A and 11A and by the ball rolling grooves 1B and 11B in a four-point contact condition. As a result, the slider 2 is supported by the guide rail 1 without shaking vertically as well as laterally, and the slider 2 is movable in the longitudinal (axial) direction.

Also in the ball circulating paths 27 of the slider 2, balls 5 having the same diameter as that of the balls 5 disposed in the grooves of the guide rail 1 and the race member 10 are loosely fitted so that they are rollable.

Next, the operation of the first embodiment will be described. When the slider 2 is moved longitudinally backward (in the upward direction in FIG. 3), the balls 5, inserted between the ball rolling grooves 1A of the guide rail 1 and the ball rolling groove 11A of the race member 10 of the slider 2, and between the ball rolling groove 1B and the ball rolling groove 11B, are rotated with the movement of the slider 2, and are moved in a direction opposite to the movement direction of the slider 2. Then, at the front end of the race member 10, the direction of the movement of the balls 5 is changed by the acute ends 29a and 29b of the protruding portions 28a and 28b an enter the curved ball grooves 26a and 26b. Thus, the balls 5 make a U-turn along the curved ball grooves 26a and 26b to pass through the ball return passages 25a and 25b. The balls 5 again make a U-turn at the curved ball grooves 26a and 26b at the opposite sides and move through the ball-rolling channels formed between the ball rolling grooves 1A and 11A, and between the ball rolling grooves 1B and 11B of the guide rail 1 and race member 10. In this manner, the balls 5 are guided successively and smoothly to the ball circulating paths 27 to circulate. In this case, since the ball circulating paths 27 of the ball guide member 20 is formed by a one-piece molding, very smooth ball passages are formed through the ball circulating paths 27, and the circulation of the balls 5 is performed smoothly.

In the first embodiment, since the ball guide member 20 forming the ball circulating paths 27 is constituted by a single member which can be formed by one injection molding, the dimensional accuracy of the ball guide member 20 can be improved. In other words, in the prior art, since the ball guide member is constituted by two members which are formed by separate metal-molds, when the two members are joined to form the ball guide member, both the members tend to deviate from their proper positions and the ball circulating paths will be narrowed to thereby disturb the rolling of the balls. Thus, in the prior art, a defective ball guide member will be frequently caused. However, in the first embodiment described above, there is no room for causing the aforementioned defects, and a reduction of the yield of product can be prevented.

Figure 1:
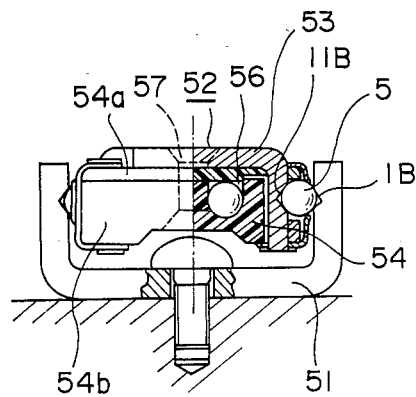
FIGS. 1 and 2 are respectively front views including partial sectional view showing two examples of prior art miniature linear guide apparatus.
Figure 2:
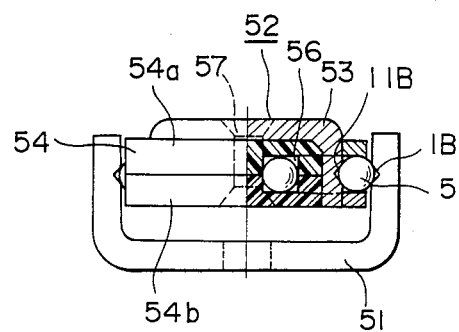

Furthermore, since the ball circulating paths 27 of the slider 2 are formed by directly covering the race member 10 on the ball guide member 20, it is possible to eliminate the upper cover 54a of the ball guide member 54 (FIG. 1). Hence, the slider 2 can be made small in size with a minimum height. In addition, the slider 2 can be assembled very simply; productivity can be improved, and the cost can be reduced.

Moreover, since the brim sections 23 having the curved ball grooves 26a and 26b formed in the opposite ends of the ball guide member 20 are completely covered by the extended portions 12 at the opposite ends of the race member 10, a complete dust-proof structure can be achieved.

Furthermore, as described in the foregoing, each of the brim sections 23 of the ball guide member 20 has protruding portions 28a and 28b which protrude laterally towards and close to the ball rolling grooves 1A and 1B so that the protruding portions 28a and 28b are fitted into the ball rolling grooves 1A and 1B. The protruding portions 28a and 28b have acute portions, respectively, at the tips thereof formed by cutting by the outer circular-arc surfaces of the curved ball grooves 26a and 26b so that the balls 5 are guided into the curved ball grooves 26a and 26b. Thus, the balls 5 can roll smoothly. In addition, since the ball rolling grooves 1A and 1B of the guide rail 1 can be formed with a large depth, while positioning the opposing surfaces of the guide rail 1 and the slider 2 close to each other, the load-carrying capacity in the vertical direction can be increased, even when small-sized balls are used. This, in turn enables the linear guide apparatus to be made small in size; to reduce the inertia of the slider and, it is possible to achieve a linear guide apparatus having satisfactory controllability at high speeds and producing little residual vibrations.

Figure 8:
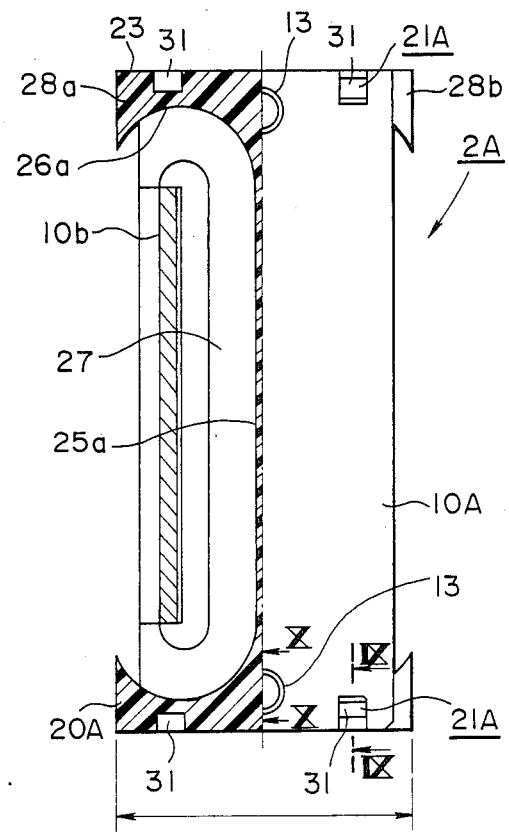
FIG. 8 is a plan view with a left half portion in cross section of a second embodiment of the present invention.
Figure 9:
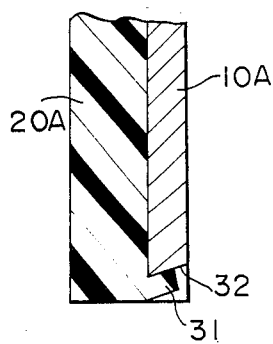
FIG. 9 is a cross sectional view taken along the line IX—IX in FIG. 8.
Figure 10:
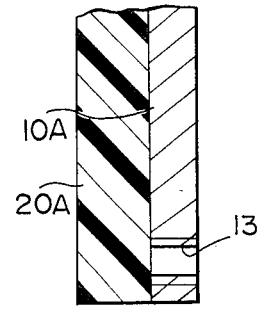
FIG. 10 is a cross sectional view taken along the line X—X in FIG. 8.

A second embodiment will be described with reference to FIGS. 8 to 10. In this embodiment, the structure of securing means 21A of a slider 2A, and the positions of female screws 13 for mounting a desired component differ from the first embodiment. Specifically, in the securing means 21A, male parts include four protrusions 31 provided on opposite ends of the ball guide member 20A, with two protrusions 31 on each of the opposite ends being spaced in the width direction. On the other hand, the male parts include cutouts 32 having slanted faces and are formed in the race member 10A, respectively, at positions corresponding to the protrusions 31. In securing the protrusions 31 to the cutouts 32, after heating the protrusions 31 to soften them, the protrusions 31 are pressed against the cutouts 32 and cool cured.

The female screws 13 for mounting a desired component are formed close to the longitudinally opposite ends of the race member 10A.

By virtue of such an arrangement, with width W of the ball guide member 20A can be reduced and, thus, in turn, the width of the linear guide apparatus can be made narrower, and the apparatus can be made much smaller in size.

In the aove embodiments, although the side walls 1b and 1c of the guide rail 1 have perpendicular surfaces, the present invention is not limited to this, and the surfaces of the side walls 1b and 1c may be slanted. In this case, the side surfaces of the race member 10 of the slider 2 opposing the side walls 1b and 1c may be slanted to form parallel slant surfaces.

In the first embodiment, the fixing holes 12a are formed in the race member 10, and the column-shaped protrusions 24 are provided on the ball guide member 20. However, this relationship may be reversed so that column-shaped protrusions are provided on the race member 10, and fixing holes may be formed in the ball guide member 20.

As described in the foregoing, in the present invention, a slider is constituted by a unitary thin-walled race member and a ball guide member formed by one-piece molding of synthetic resin and having ball circulating paths formed therein. Thus, a compact and light weight linear guide apparatus can be achieved. Furthermore, since the ball circulating paths are formed to be smooth and with high accuracy, it is possible to eliminate assembly error and to improve the yield of product of the ball guide member.

In addition, since the structure of the ball guide member becomes simple and it is completed by one molding, the expenditure for the metal-molds and the number of parts are decreased, resulting in reduction of costs to a great extent.

I claim:

1. In a miniature linear guide apparatus of the type comprising:
   a guide rail extending in a longitudinal direction and having a U-shaped cross section, said guide rail having ball rolling grooves formed, respectively, in the inner surface of the side walls thereof in an opposed relationship;
   a slider including a race member having an inverted U-shaped cross section and having ball rolling grooves, respectively, formed in the outer surfaces of the side walls thereof, said ball rolling grooves of said guide rail respectively opposing the said ball rolling grooves of said race member, and a ball guide member adapted to be fitted into a U-shaped recess of said race member and having ball circulating paths formed therein, said ball circulating paths being in communication with said ball rolling grooves of said race member and said guide rail member; and
   a plurality of balls inserted in said ball rolling grooves of said race member and said guide rail, and in said ball circulating paths within said ball guide member; the improvement which comprises:
   said ball guide member housing said ball circulating paths being formed in a groove form having upwardly directed openings, the ball guide member, including at each end portion corresponding to the longitudinal end portions of said race member protruding portions, the protruding portions protruding laterally and having curved ball grooves respectively, each of said protruding portions protruding towards and close to a corresponding one of said ball rolling grooves of said guide rail and said race member in communication through said curved ball groove, said protruding portions being integrally formed with said ball guide member;
   said slider is formed by superposing said race member on said ball guide member to cover said openings of said groove-shaped ball circulating paths, and;
   securing means, including female and male parts, respectively, provided at corresponding positions on said race member and said ball guide member to secure said race member to said ball guide member.

2. The improvement of claim 1 wherein said securing means includes a protrusion provided on one of said race member and said ball guide member, and a hole formed in the other of said race member and said ball guide member for fitting said protrusion thereinto and for welding thereto.

3. The improvement of claim 1 wherein said securing means includes protruding pieces provided on opposite ends of one of said race member and said ball guide member, and cutouts having slant faces formed in opposite ends of the other of said race member and said ball guide member to enable caulking and contact-bonding said protruding pieces.

4. The improvement of claim 1 wherein said race member includes extending portions at longitudinal opposite ends thereof to cover said protruding portions of said ball guide member, said protruding portions having said curved ball grooves formed therein.

* * * * *